United States Patent
Pirker et al.

(10) Patent No.: US 10,136,756 B2
(45) Date of Patent: Nov. 27, 2018

(54) HEATING UNIT FOR A BEVERAGE PREPARATION MACHINE

(71) Applicant: NESTEC S.A., Vevey (CH)

(72) Inventors: Gerhard Pirker, Lenzburg (CH); Michael Ayoub, Crissier (CH)

(73) Assignee: Nestec S.A., Vevey (CH)

(*) Notice: Subject to any disclaimer, the term of this patent is extended or adjusted under 35 U.S.C. 154(b) by 694 days.

(21) Appl. No.: 14/367,794

(22) PCT Filed: Dec. 6, 2012

(86) PCT No.: PCT/EP2012/074658
§ 371 (c)(1),
(2) Date: Jun. 20, 2014

(87) PCT Pub. No.: WO2013/092235
PCT Pub. Date: Jun. 27, 2013

(65) Prior Publication Data
US 2015/0059586 A1 Mar. 5, 2015

(30) Foreign Application Priority Data
Dec. 22, 2011 (EP) ..................... 11195389

(51) Int. Cl.
*A47J 31/54* (2006.01)
*A47J 31/40* (2006.01)
*F24H 1/16* (2006.01)

(52) U.S. Cl.
CPC ............. *A47J 31/54* (2013.01); *A47J 31/407* (2013.01); *A47J 31/542* (2013.01); *F24H 1/162* (2013.01)

(58) Field of Classification Search
CPC ........ A47J 31/54; A47J 31/407; A47J 31/542; F24H 1/162
(Continued)

(56) References Cited

U.S. PATENT DOCUMENTS 2,114,063 A * 4/1938 Stoner ..................... A47J 31/38
222/380
2,452,933 A * 11/1948 Joppich ................. A47J 31/401
222/129.3
(Continued)

FOREIGN PATENT DOCUMENTS

CH 605293 9/1978
CN 202020296 U 11/2011
(Continued)

*Primary Examiner* — Kenneth E. Peterson
*Assistant Examiner* — Nhat Chieu Do
(74) *Attorney, Agent, or Firm* — K&L Gates LLP

(57) ABSTRACT

A heating unit for a beverage preparation machine. The machine includes a pump for circulating a beverage preparation fluid through the machine from a fluid source to the heating unit. The heating unit is suitable for heating the fluid and includes a housing which defines a fluid heating chamber. A heating element is located inside the housing and is adapted to heat the fluid. The heating unit further includes a pre-heating tube for conveying the fluid from the pump. The pre-heating tube includes a tube inlet and a tube outlet. The tube outlet connects with the heating chamber. The pre-heating tube is located at least partly within the housing such that the heating element will at least partially heat the fluid in the pre-heating tube before the pre-heated fluid is released into the heating chamber through the outlet.

9 Claims, 7 Drawing Sheets

(58) Field of Classification Search
USPC .............. 99/433–476, 300–304, 279–295; 219/314; 392/479, 481, 451
See application file for complete search history.

(56) References Cited

U.S. PATENT DOCUMENTS

| | | | | |
|---|---|---|---|---|
| 2,673,920 | A | * | 3/1954 | Donovan ............... A47J 31/542 165/185 |
| 3,795,788 | A | * | 3/1974 | Perucca ................. A47J 31/36 392/396 |
| 4,032,748 | A | * | 6/1977 | Vischer ................. A47J 31/542 138/103 |
| 4,282,421 | A | * | 8/1981 | Hadar ................... F24H 9/0021 122/19.1 |
| 4,448,113 | A | | 5/1984 | Brabon |
| 4,602,145 | A | | 7/1986 | Roberts |
| 4,603,621 | A | * | 8/1986 | Roberts ................ A47J 31/007 239/600 |
| 4,641,011 | A | | 2/1987 | Roberts |
| 4,641,012 | A | * | 2/1987 | Roberts ................ A47J 31/007 219/513 |
| 4,809,594 | A | | 3/1989 | Vitous |
| 5,551,331 | A | | 9/1996 | Pfeifer et al. |
| 5,678,734 | A | | 10/1997 | Walker |
| 6,198,879 | B1 | * | 3/2001 | Harris ................... F24H 7/0433 392/451 |
| 6,510,783 | B1 | * | 1/2003 | Basile ................. A47J 31/3633 99/281 |
| 7,784,396 | B2 | * | 8/2010 | Fai ....................... A47J 31/3685 99/287 |
| 8,925,441 | B2 | * | 1/2015 | Steiner ................ A47J 31/4485 99/293 |
| 2006/0107839 | A1 | | 5/2006 | Nenov et al. |
| 2010/0269703 | A1 | | 10/2010 | Lin |
| 2011/0256289 | A1 | * | 10/2011 | Steiner ................ A47J 31/4485 426/523 |
| 2011/0293805 | A1 | * | 12/2011 | Perentes ................. A47J 31/22 426/433 |

FOREIGN PATENT DOCUMENTS

| | | |
|---|---|---|
| EP | 0242556 | 10/1987 |
| EP | 1472156 | 11/2004 |
| EP | 1784344 | 5/2007 |
| EP | 2062831 | 5/2009 |
| EP | 2162653 | 3/2010 |
| JP | 4631320 | 9/1971 |
| JP | 3234216 B2 | 12/2001 |
| JP | 2003299573 A | 10/2003 |
| JP | 2010528945 A | 8/2010 |
| WO | 2011121395 | 10/2011 |

* cited by examiner

HEATING UNIT FOR A BEVERAGE PREPARATION MACHINE

CROSS REFERENCE TO RELATED APPLICATIONS

The present application is a National Stage of International Application No. PCT/EP2012/074658, filed on Dec. 6, 2012, which claims priority to European Patent Application No. 11195389.9, filed Dec. 22, 2011, the entire contents of which are being incorporated herein by reference.

FIELD OF THE INVENTION

The present invention concerns a heating unit, particularly a heating unit usable in a beverage preparation machine for use with a capsule comprising a beverage preparation ingredient, said capsule being designed to be inserted into said machine for preparation of a beverage by mixing, under pressure, a fluid and said ingredient in the capsule.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine is a beverage preparation machine working with a rigid or semi-rigid capsule.

The machine preferably comprises a receptacle for accommodating said capsule and a fluid injection system for injecting a fluid, preferably water, under pressure into said capsule. Water injected under pressure in the capsule, for the preparation of a coffee beverage, is preferably hot, that is to say at a temperature above 70° C. However, in some particular instances, it might also be at ambient temperature, or even at a chilled temperature. The pressure inside the capsule chamber during extraction and/or dissolution of the capsule contents is typically about 1 to about 8 bar for dissolution products and about 2 to about 12 bar for extraction of roast and ground coffee. The present invention could also encompass the so-called "brewing" process of beverage preparation—particularly for tea and coffee. Brewing involves a time of infusion of the ingredient by a fluid (e.g. hot water), whereas the extraction or dissolution preparation process allows a consumer to prepare a beverage, for instance coffee, within a few seconds.

Generally, in the following specification, the term "brewing" of an ingredient by a fluid, is meant to encompass extraction of a powdered edible material such as for instance roast and ground powdered coffee, or dissolution of edible soluble material such as for instance soluble tea or coffee, or infusion of an edible material with an infusion fluid under very low relative pressure, or atmospheric pressure, for a longer time than that required for extraction or dissolution, for instance infusion of tea leaves by hot water.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating unit such as a boiler or a heat exchanger, which is able to warm up the water used therein to working temperatures (classically temperatures up to 80-90° C.). Finally, the machine comprises a pump element for circulating the water from the tank to the capsule, optionally though the heating unit. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules typically comprise:
a hollow body and an injection wall which is impermeable to liquids and to air and which is attached to the body and adapted to be punctured by e.g. an injection needle of the machine,
a chamber containing a bed of roast and ground coffee to be extracted,
an aluminum membrane disposed at the bottom end of the capsule, closing the capsule, for retaining the internal pressure in the chamber, the membrane being associated with piercing means for piercing dispensing holes in the aluminum membrane when the internal pressure inside the chamber reaches a certain pre-determined value,
optionally, means configured to break the jet of fluid so as to reduce the speed of the jet of fluid injected into the capsule and distribute the fluid across the bed of substance at a reduced speed. It is often important for the user to know when the water level in the machine tank is too low to prepare a full beverage.

As mentioned, such and other beverage preparation machines comprise a heating unit like a boiler or a heat exchanger. One commonly used heating unit in prior art beverage preparation machines is a so-called thermo block where water is heated passing through a number of (tiny) tubes. Thermo blocks can be made of different material like aluminum, steel, copper, etc. However, a disadvantage of such heating units is that the amount of material necessary is relatively large resulting in significant heating losses during heating and furthermore also takes a long time to heat up.

Another commonly used heating unit is the traditional boiler unit. However, that works with mixing hot and cold water together and thereby has the risk of providing cold water or water not hot enough at its outlet, which may be especially detrimental in relation to preparing beverages e.g. like coffee-based beverages as it may greatly impact the taste of the beverage.

It is therefore an objective of the present invention to provide a heating unit that avoids or at least reduces the above-mentioned drawbacks of traditional heating units.

SUMMARY OF THE INVENTION

The objective mentioned above is fulfilled with a heating unit for a beverage preparation machine said machine being suitable for preparing a beverage by mixing a beverage ingredient with a fluid, said machine comprising a pump for circulating said beverage preparation fluid through said machine at least from a fluid source to said heating unit, the heating unit (100) being suitable for heating said fluid and comprising:
(i) a housing defining a fluid heating chamber, and
(ii) a heating element located inside said housing and being adapted to heat said fluid therein,
wherein
the heating unit further comprises a pre-heating tube for conveying said fluid received from said pump through said heating unit, the pre-heating tube comprising a tube inlet and a tube outlet, the tube outlet connecting with the heating chamber, and
wherein the pre-heating tube is located at least partly within the housing in such a way that that the heating element will at least partially heat said fluid in said pre-heating tube before said pre-heated fluid is released into the heating chamber through said outlet.

In this way, a fluid, e.g. a liquid being water, is effectively heated at two stages using the same heating element during its progression through the heating unit. Furthermore, mixing of hot and cold fluid or liquid within the same mass of fluid or liquid is avoided as the fluid or liquid will be heated before arriving in the heating chamber.

In one embodiment, at least a part of the pre-heating tube has a generally cylindrical coil shape.

In one embodiment, at least a part of the heating element has a generally cylindrical coil shape.

In one embodiment, at least a part of the heating element is located inside the cylindrical coil shape of the pre-heating tube.

In one embodiment, an outer diameter of the generally cylindrical coil shape of the heating element is smaller than an inner diameter of the generally cylindrical coil shape of the pre-heating tube.

In one embodiment, the outer diameter of the generally cylindrical coil shape of the heating element is smaller than the inner diameter of the generally cylindrical coil shape of the pre-heating tube to an extent so that the cylindrical coil shape of the heating element fits closely within the generally cylindrical coil shape of the pre-heating tube.

In one embodiment, at least a part of the pre-heating tube is located inside the cylindrical coil shape of the heating element.

In one embodiment, an outer diameter of the generally cylindrical coil shape of the pre-heating tube is smaller than an inner diameter of the generally cylindrical coil shape of the heating element.

In one embodiment, the outer diameter of the generally cylindrical coil shape of the pre-heating tube is smaller than the inner diameter of the generally cylindrical coil shape of the heating element to an extent so that the cylindrical coil shape of the pre-heating tube fits closely within the generally cylindrical coil shape of the heating element.

In one embodiment, the housing further comprises a central opening, wherein the volume and/or shape of the central opening enables optimisation of a volume of fluid in the heating chamber in relation to the heating element.

In one embodiment, the central opening has a cross-section that is substantially circular at at least one predetermined location.

In one embodiment, said preheating tube is located at a distance from said heating element that is less than 10 mm, preferably less than 5 mm, more preferably less than 1 mm.

According to another aspect the invention relates to a beverage preparation machine comprising: a reservoir for a fluid, a brewing head adapted to receive at least one ingredient capsule comprising at least one beverage preparation ingredient, a pump for pumping a predetermined volume of said fluid from said reservoir to said brewing head, such that said fluid can be injected into said capsule, when received by said brewing head, to mix with said ingredient under pressure and produce a predetermined volume of beverage, a heating unit for optionally heating said fluid pumped from said reservoir before it enters the capsule, wherein the heating unit is a heating unit according to any one of claims 1-12.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
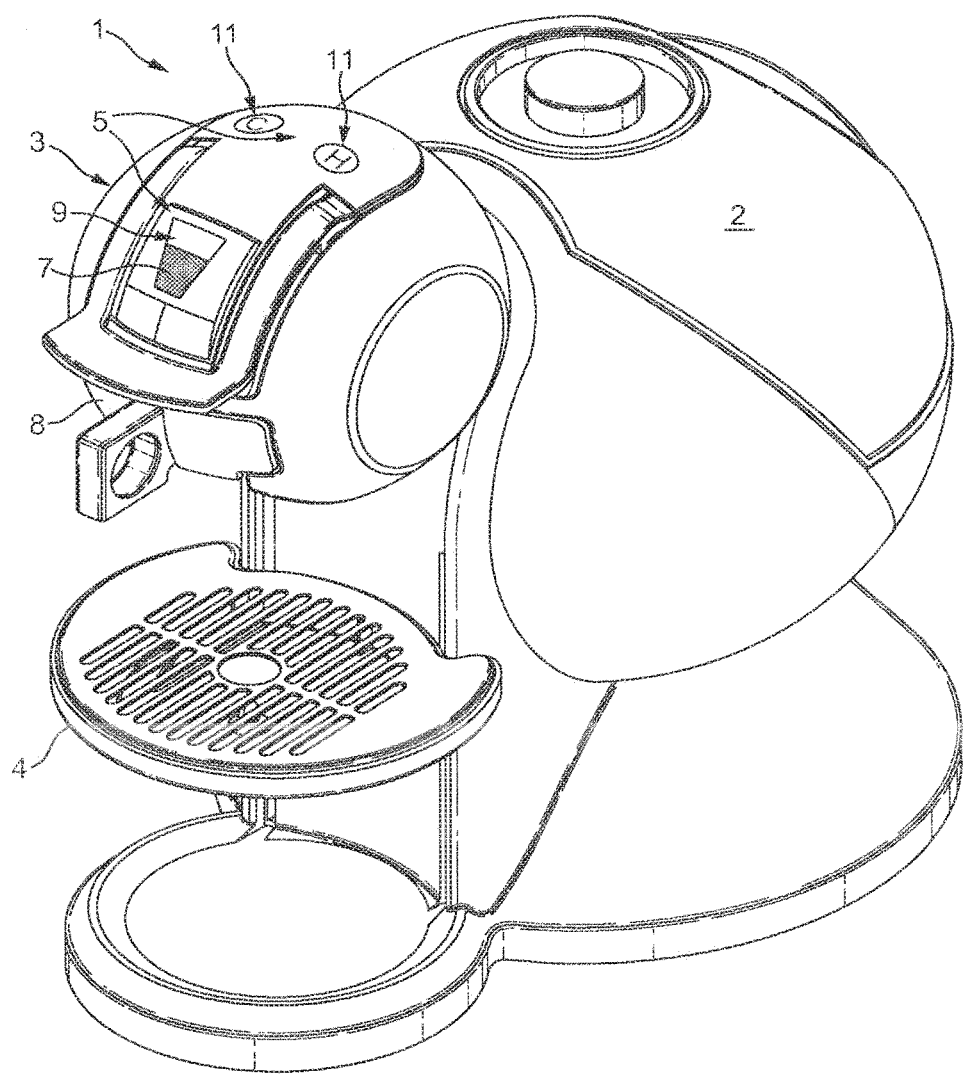
FIG. 1 is a schematic view of a beverage preparation machine advantageously comprising a heating unit as described elsewhere.

FIG. 1 is a schematic view of a beverage preparation machine advantageously comprising a heating unit as described elsewhere. Shown is a beverage preparation machine 1 comprising a reservoir 2 for a fluid (preferably a liquid being water), a brewing head 3 adapted to receive at least one ingredient capsule (not shown; see e.g. 200 in FIG. 2) comprising at least one beverage preparation ingredient (not shown; see e.g. 204 in FIG. 2), and a pump (not shown), like a pressure pump or corresponding unit, for pumping a predetermined volume of the fluid from the reservoir 2 to the brewing head 3, such that the fluid can be injected into the capsule to mix with the ingredient under pressure, and thereby produce a predetermined volume of beverage which then is dispensed e.g. in a cup or other container (not shown) e.g. placed onto a tray or the like 4.

The beverage preparation machine 1 further comprises a heating unit (not shown; see e.g. 100 in FIGS. 3-7) for optionally and selectively heating the fluid pumped from the reservoir 2 before it enters the capsule and an electronic control system (not shown) able to receive input from a user operated control panel or the like 5 and to actuate operation of the various components of the beverage preparation machine 1 like pump, heating element, control panel, and/or brewing head 3, etc. The control panel or the like 5 may e.g. comprise one or more user selection elements, like physical and/or on-screen buttons 11, and/or a display 9 for showing text and/or graphical information 7 to a user.

The beverage preparation machine 1 further comprises a capsule holder 8, which is used to load one or more capsules into the beverage preparation machine and place the loaded capsule(s) into the brewing head 3 for use by the beverage preparation machine 1.

Different embodiment of the heating element will be discussed in further details in connection with FIGS. 3-7.

Figure 2:
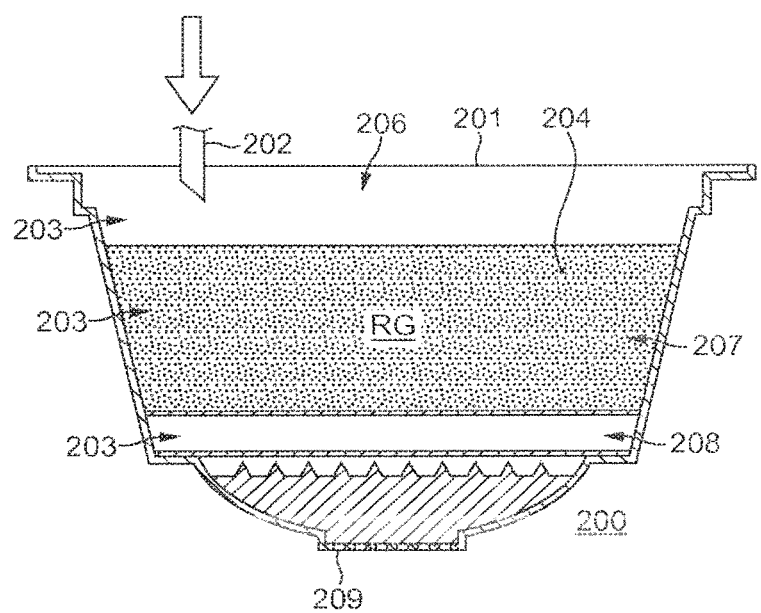
FIG. 2 is a schematic profile cut view of a capsule according to the prior art at the beginning of liquid injection therein.

FIG. 2 is a schematic profile cut view of a capsule according to the prior art at the beginning of liquid injection therein. Shown is a capsule 200 comprising an injection wall or membrane 201 (referred to as top membrane) which is to be pierced by a fluid injection needle 202 of a beverage preparation machine (not shown; see e.g. 1 in FIG. 1). When liquid is injected in a capsule compartment 203, a pressure is built up, which serves as an extraction means for extracting ingredients 204 contained inside the capsule, as described above.

In case the capsule 200 contains soluble ingredient to extract, the capsule compartment 203 generally comprises one single portion, and the residual fluid pressure is distributed across the compartment volume.

The capsule compartment 203 may be divided into several portions, e.g. as illustrated in FIG. 2. In this case, the capsule 200 comprises a top portion 206, which accommodates the fluid injection needle 202 when inserted and the ingredient to be extracted 204, typically roast and ground coffee "RG", is contained in a central portion 207 of the capsule where the top portion 206 is disposed above the central portion 207. In addition, another portion 208 is disposed below the central portion 207 and comprises another membrane 209 (referred to as bottom membrane) closing the capsule through which the extracted or dissolved substance is released.

Figure 3:
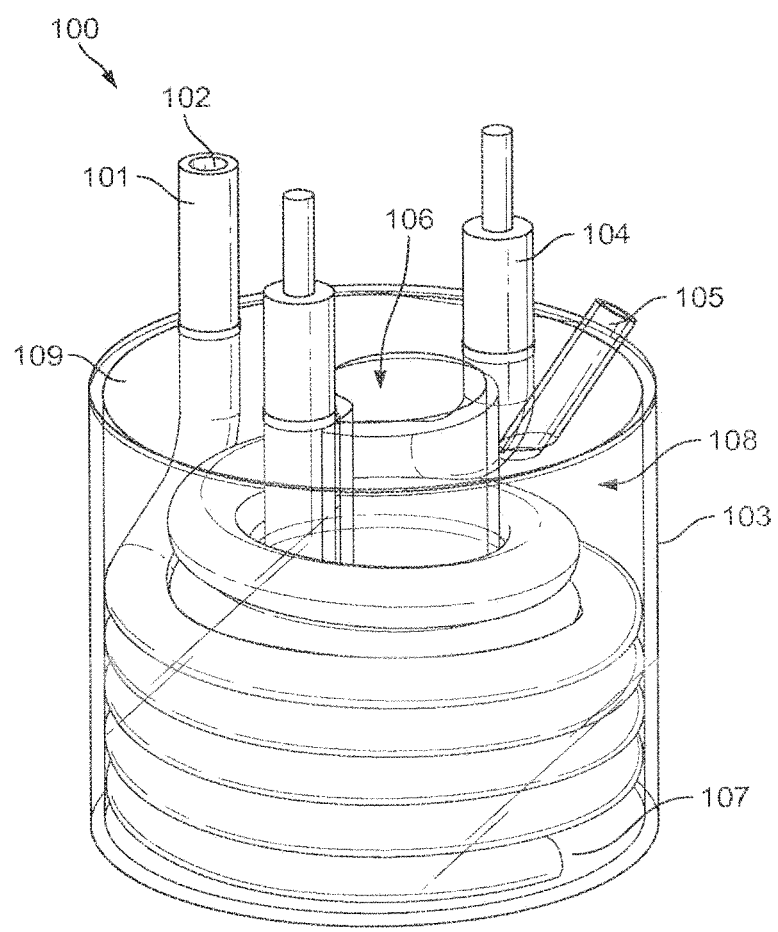
FIG. 3 is a schematic perspective view of a heating unit according to one aspect.

FIG. 3 is a schematic perspective view of a heating unit according to one aspect. Shown is heating unit 100, e.g. for a beverage preparation machine (not shown; see e.g. 1 in FIG. 1), comprising a casing or housing 103 (forth only denoted housing), a heating element 104, a pre-heating tube 101 for receiving a fluid, preferably a liquid like water, e.g. a pumped from a fluid reservoir (not shown; see e.g. 2 in FIG. 1). The pre-heating tube comprises a tube inlet 102 and a tube outlet 107 terminating in or connecting with a heating chamber 108 in the housing 103. At least a part of the heating element 104 (i.e. the active part) is located in the heating chamber 108 and is adapted to heat a liquid therein. The housing 103 further comprises a liquid outlet 105 connected to the heating chamber 108 where the liquids exits the housing 103 after being heated by the heating element 104. The housing 103 further comprises a central hole or opening 106 in a housing part 109. The pre-heating tube 101 is located at least partly within the housing 103 and in such a way that the heating element 104 will heat a liquid inside the pre-heating tube 101 when the liquid passes through the pre-heating tube 101 from the tube inlet 102 to the tube outlet 107.

In this way, a liquid is effectively heated at two stages using the same heating element 104; firstly when moving via the pre-heating tube 101 after entering the heating unit 100 and then again a second time when the liquid is received in the heating chamber 108 and passing through to the liquid outlet 105. This provides a very efficient way of heating the liquid. Furthermore, the issue of mixing hot and cold liquid or water within the same mass of liquid or water, as e.g. is done in current boiler type heaters, is avoided as the liquid or water will be heated before arriving in the heating chamber 108. Additionally, the start-up time necessary for providing adequately heated water is also reduced.

The pre-heating tube 101 may be an otherwise regular tube but is designated so since it provides initial- or pre-heating of the liquid or water before it enters the heating chamber 108.

In a further embodiment (as shown in FIG. 3), at least a part of the pre-heating tube 102 has a generally cylindrical coil shape. In the same manner, at least a part of the heating element 104 also has a generally cylindrical coil shape and at least a part of the heating element 104 is located inside the cylindrical coil shape of the pre-heating tube 102.

Figure 8:
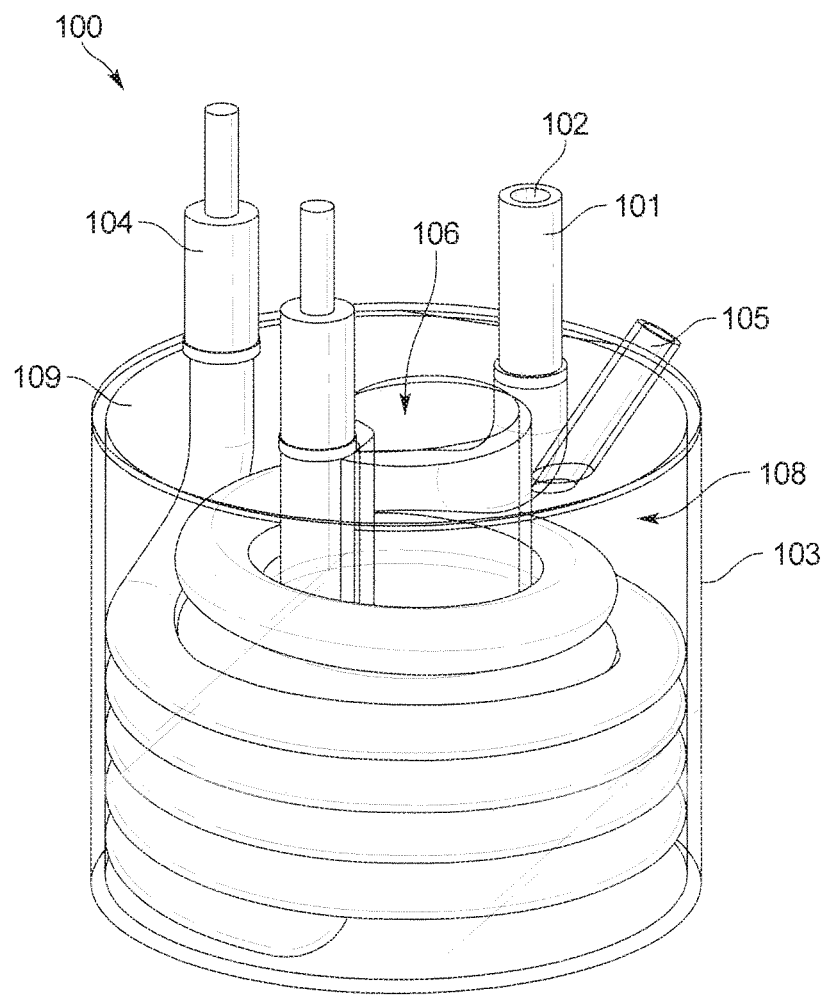
FIG. 8 is a schematic perspective view of a heating unit according to one aspect.

In a particular embodiment (as shown in FIG. 3), an outer diameter of the generally cylindrical coil shape of the heating element 104 is smaller than an inner diameter of the generally cylindrical coil shape of the pre-heating tube 102 to an extent so that the cylindrical coil shape of the heating element 104 fits closely within the generally cylindrical coil shape of the pre-heating tube 102. Alternatively, the configuration illustrated in the FIG. 3 can be reversed (as shown in FIG. 8) so that the fluid-conveying pre-heating coiled tube 102 has a smaller diameter than the coiled heating element 104, such that the latter is located in the inside with the heating coil located all around on the outside of said pre-heating tube 102. In other words, at least a part of the generally cylindrical coil shape of the pre-heating tube 102 is located inside the generally cylindrical coil shape of the heating element 104. This may be beneficial as in some embodiments of a heating element there may be minimal bending radius for an effective heating element 104 and this enables the heating element to have the bigger radius while still providing a compact heating unit 100.

This provides a very compact heating unit 100 and also an effective heating of the liquid or water in the pre-heating tube 102. It is to be understood that the difference of diameters may be larger in certain embodiments. The housing 103 may also have a generally cylindrical shape adding to the compactness of the heating unit 100. Control of the temperature may e.g. be provided using a temperature sensor arranged e.g. in close proximity to the liquid outlet 105 where the heating effect of the heating element 104 may be regulated in response to output from the temperature sensor and input in the form of required or preferred temperature received from a control system or the like.

Figure 4:
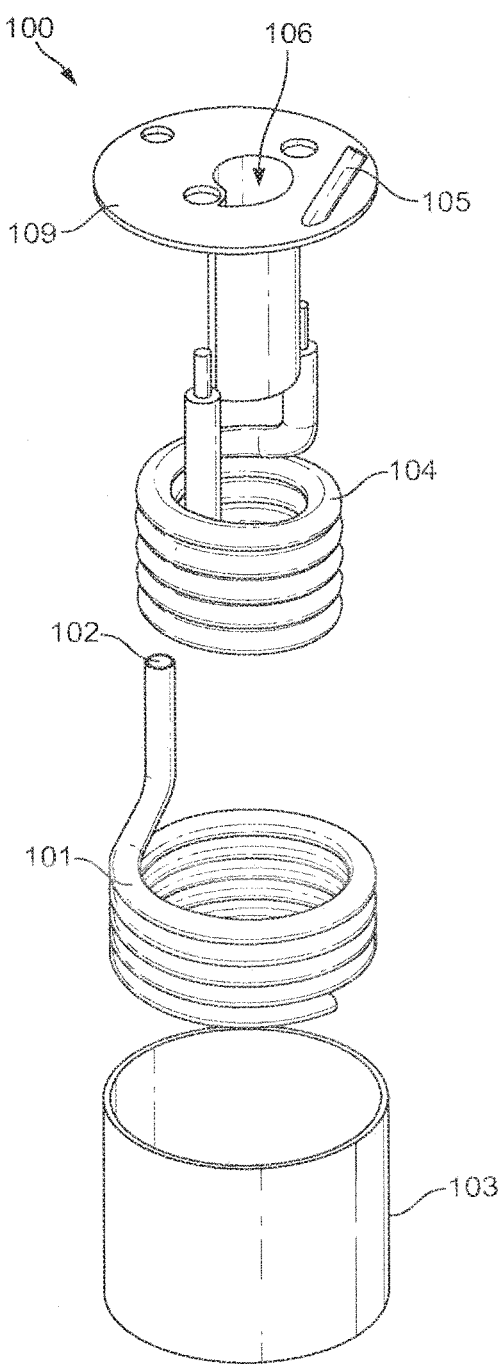
FIG. 4 is a schematic exploded view of the heating unit of FIG. 3.

FIG. 4 is a schematic exploded view of the heating unit of FIG. 3. Shown is a heating unit 100 with its elements separated in an exploded view. The elements correspond to the ones shown and explained e.g. in connection with FIG.

3. The housing part 109 is in this figure shown more clearly. The housing part 109 forms the top piece of the housing 103 and has various cut-outs or holes to accommodate parts of the elements that protrude outside the housing 103, e.g. like the tube inlet 102 and parts of the heating element 104.

The central hole or opening 106 of the housing part 109 has in this embodiment a cross-section shaped like a drop. The presence of the central hole or opening 106 may be used to optimise the volume of liquid in the heating chamber in relation to the provided heating element, i.e. so the effect of the heating element is adjusted to the volume of liquid thereby ensuring increased heating efficiency and/or reduced heating time. Furthermore, the specific shape of the central hole or opening 106 may also optimise the heating capabilities of the heating element, e.g. by governing the distance between fluid at various places in the heating chamber and various parts of the heating element. Such a central hole or opening 106 works well especially in connection with a heating element and/or pre-heating tube of a generally cylindrical coil shape as the coil shape(s) can 'go around' the hole or opening. As can be seen from the figure, the drop like shape enables for some layouts of the heating element—a close proximity between a wall of the central hole or opening and the heating element avoiding the presence of liquid having a relatively great distance to the heating element.

Figure 5:
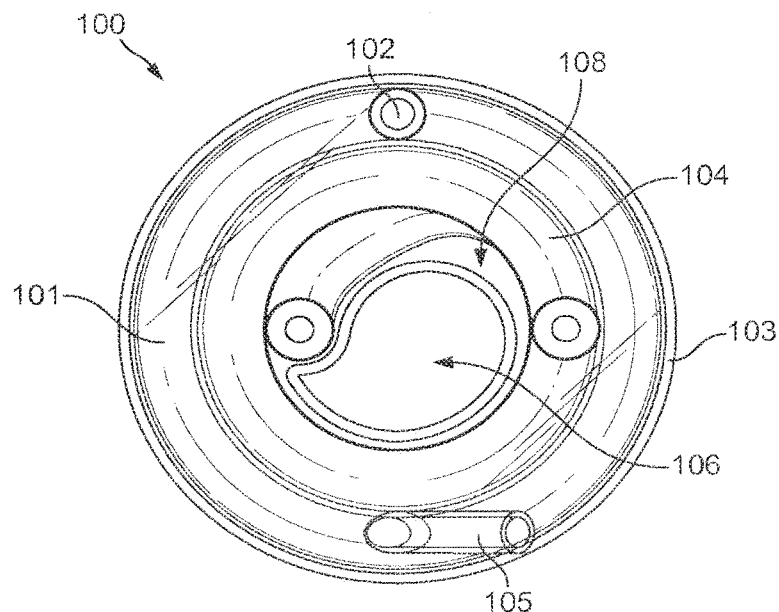
FIG. 5 is a schematic top view of the heating unit of FIG. 3.

FIG. 5 is a schematic top view of the heating unit of FIG. 3. This view readily shows the compact nature of this particular embodiment of the heating unit 100 and the shape of the central hole or opening 106.

Figure 6:
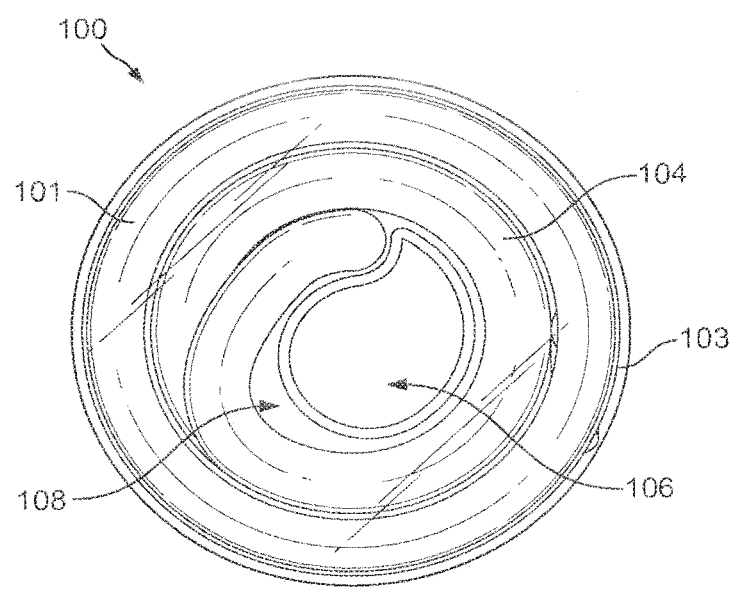
FIG. 6 is a schematic bottom view the heating unit of FIG. 3.

FIG. 6 is a schematic bottom view the heating unit of FIG. 3. This view also readily shows the compact nature of this particular embodiment of the heating unit 100 and the shape of the central hole or opening 106.

Figure 7:
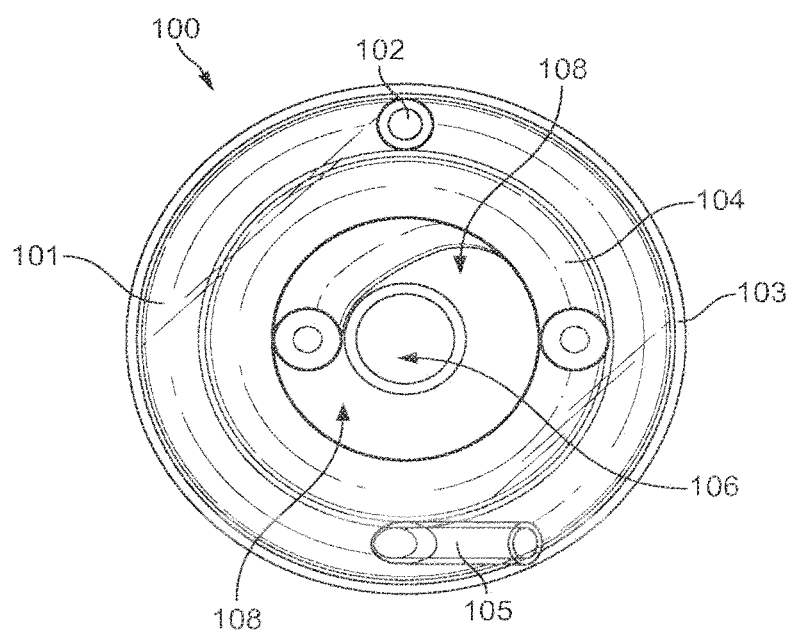
FIG. 7 is a schematic top view of an alternative heating unit.

FIG. 7 is a schematic top view of an alternative heating unit. This heating unit 100 corresponds to the heating unit of FIG. 3 except that the central hole or opening 106 in this embodiment has a circular a cross-section instead of a drop-like shape. The central hole or opening 106 has in this embodiment, the same purpose as mentioned in relation to FIG. 4, namely to adjust the volume of liquid in the heating chamber in relation to the provided heating element and to a smaller but still present effect to provide a close proximity between a wall of the central hole or opening and the heating element. Furthermore, a central hope or opening with a circular cross-section is easier and thereby cheaper to manufacture.

Throughout the present description, the term "top membrane" should be understood as the membrane which is pierced by the fluid injection needle of the machine, as opposed to the "bottom membrane" which should be understood as the membrane located on the opposite side of the capsule. This definition is such that "top" and "bottom" membranes are defined whatever the position of the capsule is within the machine when both capsule and machine are engaged in a functional manner.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A heating unit for a beverage preparation machine, the machine suitable for preparing a beverage by mixing a beverage ingredient with a fluid, the machine comprising a pump for circulating the beverage preparation fluid through the machine at least from a fluid source to the heating unit, the heating unit suitable for heating the fluid and comprising:

(i) a housing defining a fluid heating chamber;

(ii) a heating element located inside the housing and adapted to heat the fluid therein; the heating unit further comprises a pre-heating tube for conveying the fluid received from the pump through the heating unit, the pre-heating tube comprising a tube inlet and a tube outlet, the tube outlet connecting with the heating chamber; and wherein the pre-heating tube is located at least partly within the housing such that the heating element will at least partially heat the fluid in the pre-heating tube before the pre-heating tube ends and the pre-heated fluid is released into the heating chamber through the outlet, the pre-heating tube is located at a distance from the heating element that is less than 10 mm, and the heating unit has a single configuration selected from the group consisting of (a) a first configuration in which an outer diameter of a cylindrical coil shape of the heating element is smaller than an inner diameter of a cylindrical coil shape of the pre-heating tube, and the cylindrical coil shape of the heating element is positioned within the cylindrical coil shape of the pre-heating tube, and (b) a second configuration in which an outer diameter of a cylindrical coil shape of the pre-heating tube is smaller than an inner diameter of a cylindrical coil shape of the heating element, and the cylindrical coil shape of the pre-heating tube is positioned within the cylindrical coil shape of the heating element; and (iii) a central opening defined by a wall extending from the housing into an interior of the cylindrical coil shape of the heating element such that, in the first configuration, the central opening positions a portion of the pre-heated fluid between the wall and the inner diameter of the cylindrical coil shape of the heating element, and each coil of the pre-heating tube abuts the housing, or in the second configuration, the central opening positions a portion of the pre-heated fluid between the wall and the inner diameter of the cylindrical coil shape of the pre-heating tube, and each coil of the heating element abuts the housing, and at least one feature of the central opening selected from the group consisting of (i) a volume and (ii) a shape enables an optimization of a volume of fluid in the heating chamber in relation to the heating element.

2. The heating unit according to claim 1, wherein at least a part of the heating element is located inside the cylindrical coil shape of the pre-heating tube.

3. The heating unit according to claim 1, wherein an outer diameter of the cylindrical coil shape of the heating element is smaller than an inner diameter of the cylindrical coil shape of the pre-heating tube.

4. The heating unit according claim 1, wherein at least a part of the pre-heating tube is located inside the cylindrical coil shape of the heating element.

5. The heating unit according to claim 1, wherein an outer diameter of the cylindrical coil shape of the pre-heating tube is smaller than an inner diameter of the cylindrical coil shape of the heating element.

6. The heating unit according to claim 1, wherein the central opening has a cross-section that is substantially circular at an at least one predetermined location.

7. A beverage preparation machine comprising:
(i) a reservoir for a fluid;
(ii) a brewing head adapted to receive at least one beverage preparation ingredient;
(iii) a pump for pumping a predetermined volume of the fluid from the reservoir to the brewing head, such that the fluid can be injected into the brewing head, to mix with the ingredient under pressure and produce a predetermined volume of beverage;
(iv) a heating unit for heating the fluid pumped from the reservoir before the fluid pumped from the reservoir enters the brewing head; and the heating unit comprises a housing defining a fluid heating chamber, a heating element located inside the housing and adapted to heat the fluid therein, a pre-heating tube for conveying the fluid received from the pump through the heating unit, the pre-heating tube comprising a tube inlet and a tube outlet, the tube outlet connecting with the heating chamber; and the pre-heating tube is located at least partly within the housing such that the heating element will at least partially heat the fluid in the pre-heating tube before the pre-heating tube ends and the preheated fluid is released into the heating chamber through the outlet, the pre-heating tube is located at a distance from the heating element that is less than 10 mm, and the heating unit has a single configuration selected from the group consisting of (a) a first configuration in which an outer diameter of a cylindrical coil shape of the heating element is smaller than an inner diameter of a cylindrical coil shape of the pre-heating tube, and the cylindrical coil shape of the heating element is positioned with the cylindrical coil shape of the pre-heating tube, and (b) a second configuration in which an outer diameter of a cylindrical coil shape of the pre-heating tube is smaller than an inner diameter of a cylindrical coil shape of the heating element, and the cylindrical coil shape of the pre-heating tube is positioned within the cylindrical coil shape of the heating element; and
(v) a central opening defined by a wall extending from the housing into an interior of the cylindrical coil shape of the heating element such that, in the first configuration, the central opening positions a portion of the pre-heated fluid between the wall and the inner diameter of the cylindrical coil shape of the heating element, and each coil of the pre-heating tube abuts the housing, or in the second configuration, the central opening positions a portion of the pre-heated fluid between the wall and the inner diameter of the cylindrical coil shape of the pre-heating tube, and each coil of the heating element abuts the housing, and at least one feature of the central opening selected from the group consisting of (i) a volume and (ii) a shape enables an optimization of a volume of fluid in the heating chamber in relation to the heating element.

8. The beverage preparation machine according to claim 7, wherein the brewing head is adapted to receive at least one ingredient capsule comprising the least one beverage preparation ingredient and to inject the fluid into the at least one ingredient capsule, when received by the brewing head.

9. The beverage preparation machine according to claim 7, wherein the pump is configured to inject the fluid into the brewing head under pressure.

* * * * *